July 4, 1950     N. A. DE BRUYNE     2,514,226
DEVICE FOR MAINTAINING A CONSTANT FLUID PRESSURE
Filed Oct. 26, 1948
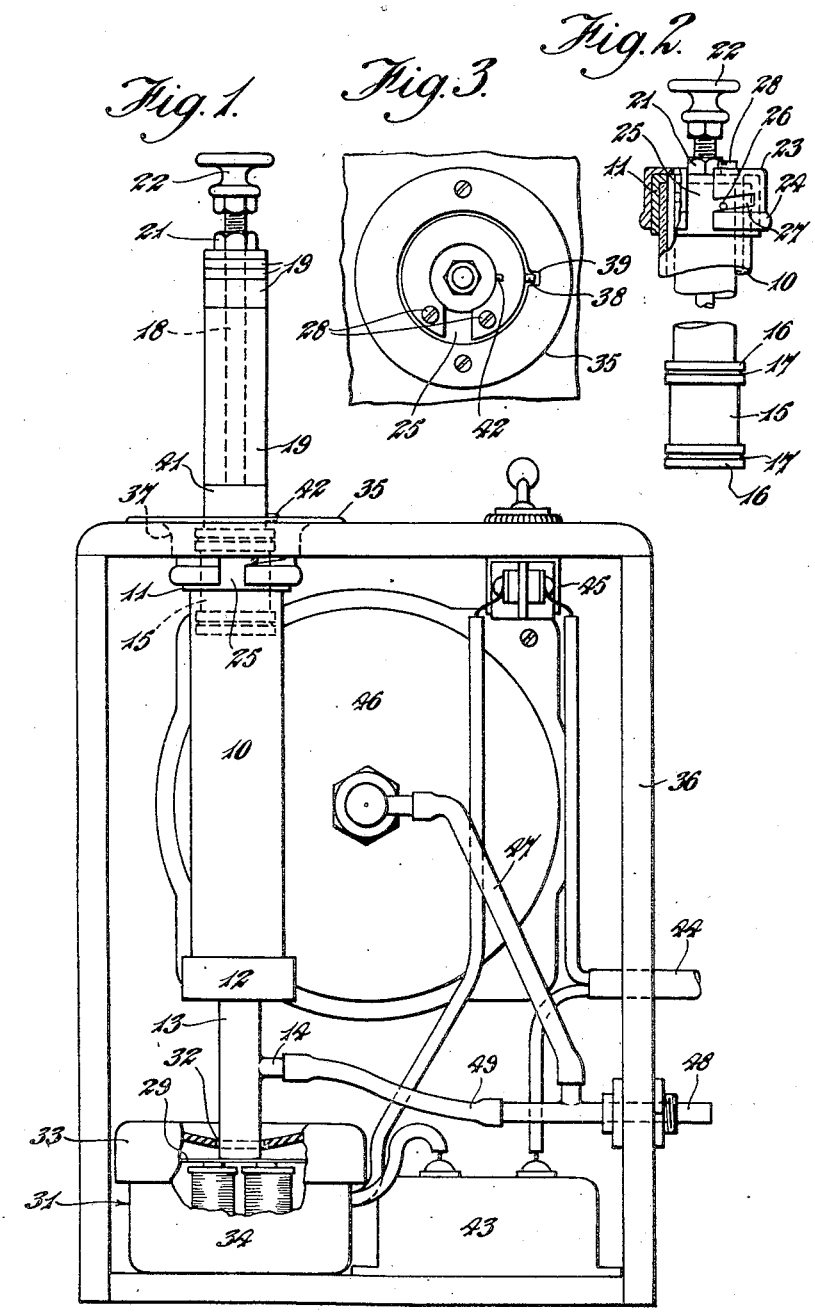

Patented July 4, 1950

2,514,226

UNITED STATES PATENT OFFICE 2,514,226

DEVICE FOR MAINTAINING A CONSTANT FLUID PRESSURE

Norman Adrian de Bruyne, Duxford, England, assignor to Techne (Cambridge) Limited, Duxford, England Application October 26, 1948, Serial No. 56,486
In Great Britain January 28, 1948

2 Claims. (Cl. 222—3)

This invention relates to devices for maintaining a constant fluid pressure, particularly a pressure of low value, and has for its object to provide such a device in which the fluid pressure is maintained constant to a very high degree of accuracy.

According to the invention a device for maintaining a constant or substantially constant fluid pressures, comprises a cylinder-and-piston unit mounted vertically so that pressure is exerted on fluid in the cylinder due to the weight of the piston, and means for maintaining the cylinder-and-piston unit in a state of vibration, the piston fitting closely, but not airtightly, in the cylinder, and being formed with at least one circumferential groove to receive a lubricant acting to provide an airtight seal between the piston and the cylinder.

The fit between the piston and cylinder is preferably such that when both are dry and free of all lubricant, and the lower end of the cylinder is closed, the piston will descend slowly under its own weight.

The invention is hereinafter described with reference to the accompanying drawings in which:

Figure 1 shows, in elevation, one form of device according to the invention, the device being mounted in a cabinet with a pressure gauge and a switch for the vibrating means;

Figure 2 is a detail of the piston and of the upper end of the cylinder-and-piston unit; and Figure 3 is a partial plan view of the device shown in Figures 1 and 2.

Referring to the drawings, the device shown therein, which is suitable for maintaining a constant pressure on the liquid in a viscometer in which the liquid is forced to pass through a capillary, comprises a cylinder-and-piston unit the cylinder of which is constituted by a glass tube 10 sealed into metallic end caps 11 and 12, one of which, 11 comprises a mere ring which leaves the bore of the tube unobstructed, whilst the other, 12, closes the end of the tube, and has a stem 13 projecting outwardly from its centre, the stem being drilled from its upper end to provide a stopped passage leading into a conduit 14 projecting from the side of the stem. The piston 15 is formed with a land 16 at each end, and with a reduced waist between the lands each land being divided into two by a circumferential groove 17. The lands 16 are machined to such a diameter that the piston will descend slowly in the cylinder under its own weight when both are quite dry and free from lubricant. A screw-threaded rod 18 is mounted in a screw-threaded hole in the top of the piston, the rod 18 supporting weights 19 held in position therein by a nut 21, and having a knob 22 at its upper end. A metal collar 23 having a rounded rib 24 formed in it is mounted on the end cap 11, the collar being substantially L-shaped in cross section, and being slotted radially as at 25 to enable it to be separated from the piston assembly without removing the knob. The collar 23 is located on the cap 11 by a radial pin 26 in the cap 11 entering an inclined slot 27 extending from one side of the slot 25 in the collar.

The stem 13 rests at its lower ends on the diaphragm 29 of an electro-magnetic vibrator unit 31 resembling a telephone earpiece, the stem 13 passing through an opening 32 in a cover 33 screwed on to the casing 34 of the vibrator. At its upper end the tube 10 is located in a metal ring 35 secured by screws to the casing 36 of the device, the ring 35 having a downwardly extending flange 37 in which the collar 23 fits loosely, being prevented from passing upwardly through the ring 35 by the rib 24. The tube 10 is thus supported in a vertical position, but is free to move slightly in a vertical direction. Rotation of the tube 10 in the ring 35 is prevented by a pin 38 on the collar 23 entering a notch 39 in the ring 35.

A metal sleeve 41 mounted on the rod 18 between the piston 15 and the weights 19 has a radially projecting pin 42 mounted therein, the pin being short enough to permit the piston to slide in the tube 10, but being long enough to project beyond the inner periphery of the collar 23. The pin 42 will thus pass the collar 23 only when it is aligned with the slot 25 therein, and the piston assembly can be held in a raised position, as shown in Figure 1, by lifting it until the pin 42 passes through the slot 25 to the upper side of the collar, and rotating the piston assembly through a small angle. Screws 28 prevent rotation of the piston assembly through more than a small angle when the said assembly is in the raised position.

A condenser 43 is mounted in the casing 34, and a twin-wire cable 44 adapted for connection to alternating electric current supply mains has one wire connected to the condenser, and the other to a switch 45. The other terminals of the condenser and switch are connected respectively to the opposite ends of the magnetising coil of the vibrator 31.

A pressure gauge 46 is mounted in the casing 34, its dial being visible at the front of the casing, and is connected by a flexible tube 47 to a rigid tube 48 projecting through the side of the casing, the tube 48 being also connected by a flexible tube 49 to the conduit 14.

When the piston and cylinder are assembled, lubricating oil is placed on the piston, the oil entering the grooves 17 and acting as a seal to prevent the escape of air between the piston and the cylinder.

In use, the end of the tube 48 which projects from the casing is connected to the point at which the pressure is to be applied, the piston having been first lifted and held in its lifted position by the pin 42. The switch is operated to render the vibrator operative, and the piston is then turned to a position in which it is free to move downwardly, thus exerting pressure on the air in the tube 10.

During the displacement of the fluid through the capillary of the viscometer, the piston descends slowly in the tube, the continuous vibration of the tube preventing it from sticking, so that the pressure exerted is constant.

A suitable frequency for the vibration is the standard alternating current mains frequency of fifty cycles per second, and the amplitude of the vibration is quite small, its actual value not being critical. The amplitude may be such as to be perceptible when the tube is touched.

Instead of being supported on a vibrating diaphragm, the cylinder-and-piston unit may be clamped to an armature arranged to be vibrated in a horizontal direction by an electro-magnet.

What I claim is:

1. A device for maintaining a constant or substantially constant fluid pressure, comprising a cylinder-and-piston unit mounted vertically so that pressure is exerted on fluid in the cylinder due to the weight of the piston, and means for maintaining the cylinder-and-piston unit in a state of vibration, comprising an electro-magnet, an armature associated with said electro-magnet and engaging said cylinder-and-piston unit, and means for connecting said electro-magnet to a source of alternating current so as to produce vibration of said armature, the piston fitting closely, but not airtightly, in the cylinder, and being formed with at least one circumferential groove to receive a lubricant acting to provide an airtight seal between the piston and the cylinder.

2. A device for maintaining a constant or substantially constant fluid pressure, comprising a cylinder-and-piston unit mounted vertically so that pressure is exerted on fluid in the cylinder due to the weight of the piston, and means for maintaining the cylinder-and-piston unit in a state of vibration, comprising a diaphragm supporting the cylinder-and-piston unit, an electro-magnet associated with said diaphragm, and means for connecting said electro-magnet to a source of alternating current so as to produce vibration of said armature, the piston fitting closely, but not airtightly, in the cylinder, and being formed with at least one circumferential groove to receive a lubricant acting to provide an airtight seal between the piston and the cylinder.

NORMAN ADRIAN DE BRUYNE.

REFERENCES CITED

The following references are of record in the file of this patent:

UNITED STATES PATENTS

| Number | Name | Date |
|---|---|---|
| 146,964 | Vallentin | Jan. 27, 1874 |
| 304,289 | Barthel | Sept. 2, 1884 |